Patented Mar. 16, 1943

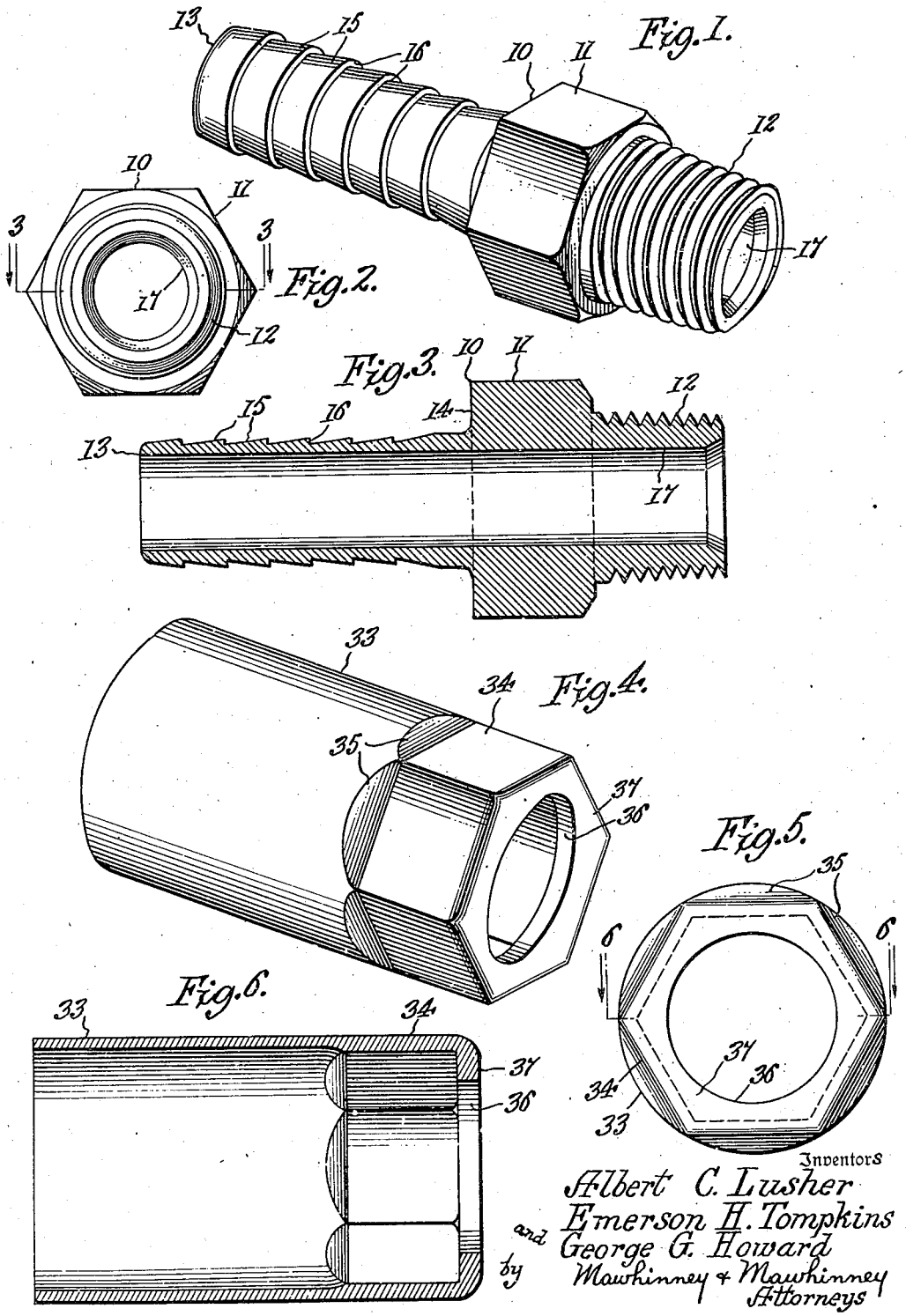

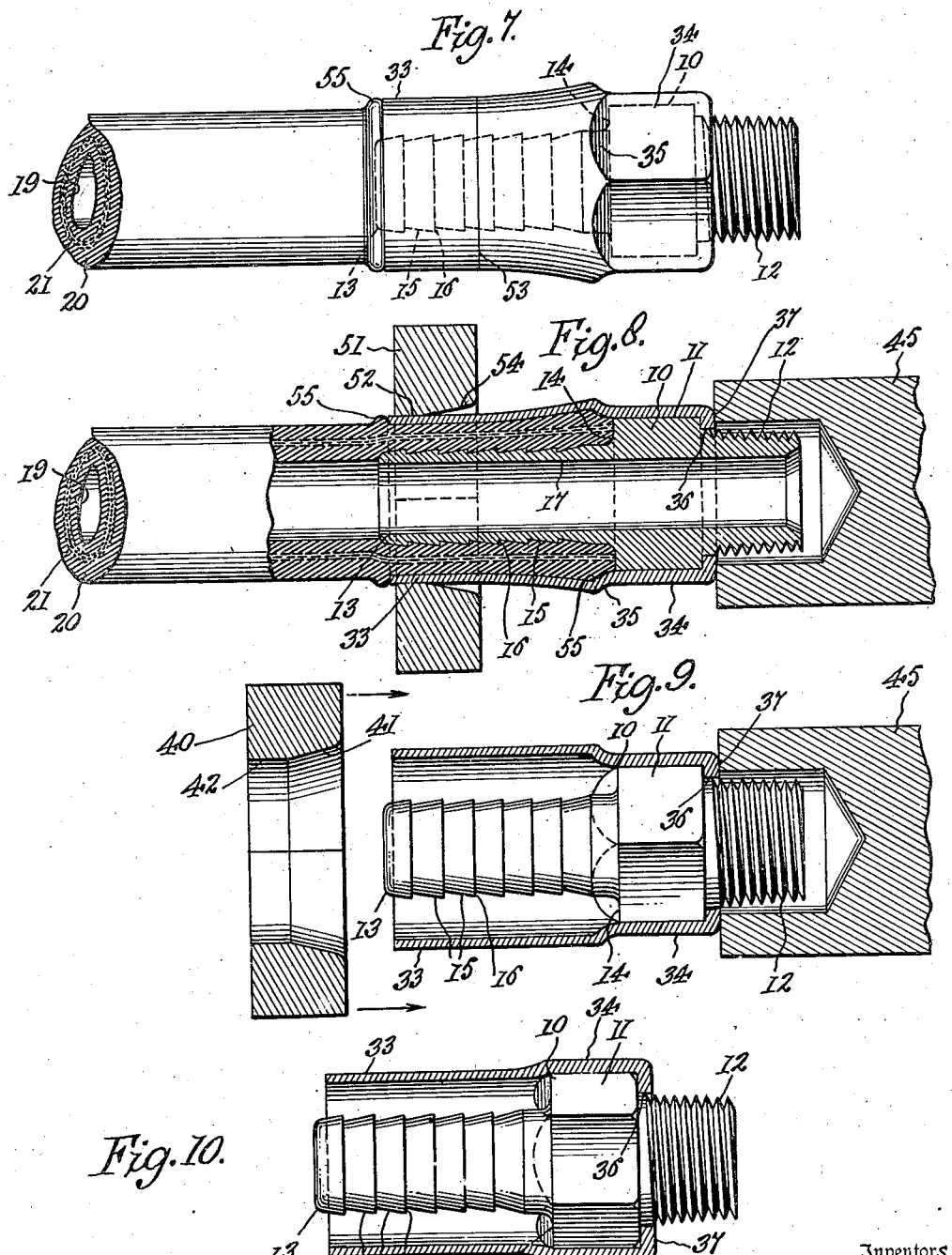

2,314,001

UNITED STATES PATENT OFFICE 2,314,001

HIGH PRESSURE HOSE COUPLING

Albert C. Lusher, Emerson H. Tompkins, and George G. Howard, Waterbury, Conn., assignors to Scovill Manufacturing Company, Waterbury, Conn., a corporation of Connecticut Application December 3, 1941, Serial No. 421,519

7 Claims. (Cl. 285—84)

The present invention relates to improvements in high pressure hose couplings, and is a continuation in part of the similarly entitled application filed November 26, 1940, Serial No. 367,302, by Albert C. Lusher and Allan C. Hoffman.

This is a companion case, covering the coupling per se as an article, to an application executed of even date herewith entitled Method of making and assembling high pressure hose couplings filed December 3, 1941, Serial Number 421,520, in the names of Albert C. Lusher, Emerson H. Tompkins, Frederick R. Reutter and George G. Howard.

An object of the invention is to improve the type of coupling disclosed in application Serial Number 367,302 aforesaid by dispensing with the necessity for the spider of that prior application and to this extent lowering manufacturing costs attended by saving of material and without sacrificing any of the desirable characteristics of such coupling, and in fact securing if anything a superior coupling article particularly as regards strength of connection between the hose and coupling, long life in satisfactory service and substantial leak proofness throughout that long life.

Due to the elimination of the spider the coupling is assembled more easily and quickly and simply not only as regards its connection with the hose but also in its initial combining of its separately manufactured component parts.

A further object of the invention is to provide an extremely simple form of coupling which will possess a high degree of tenacity in its grip and retention upon the end of a hose to carry high pressures without liability of the coupling "blowing off" the end of the hose, which is a common failure of the union between hose and coupling body of prior devices when employed in carrying high pressure.

A still further object of the invention is to provide a high pressure coupling that for the most part is made of light weight sheet metal materials, is die contracted, and is capable of relatively easy assembly to the end of a hose, such as by means of a hydraulic or jack press. The coupling is further designed to be secured to the end of a high pressure hose without the necessity of having to strip the outer layer of covering material down to the reinforcing wire braiding or mesh customarily found disposed intermediately any high pressure hose.

A still further object of the invention is to provide improved clamping means designed to interlock the hose with the coupling member to preclude any axial displacement due to pull strains upon the hose.

It is a still further object of the invention to provide means to compress and at the same time interlock the hose about the nipple of the coupling member wherein the interlocking is strong against axial displacement or separation of the hose from the coupling.

A still further object of the invention is to secure a high degree of leak-proof characteristics in the hose coupling in an economical manner by retaining substantially unchanged the conventional type of coupling body with the addition thereto of interlocking and compression and contraction means as may be fitted to, and received on, the coupling body in an easily assemblable manner, which involves small costs in materials and labor and which when in final position will yield a high degree of utility as a high pressure coupling.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of a form of coupling body suitable for use with the present invention.

Figure 2 is an end elevation of the same viewed from the right end of Figure 1.

Figure 3 is a longitudinal section therethrough taken on the line 3—3 in Figure 2.

Figure 4 is a perspective view of a form of outside contractile sleeve employed.

Figure 5 is an end elevation of the sleeve looking at the right end in Figure 4.

Figure 6 is a longitudinal section through the sleeve taken on the line 6—6 in Figure 5.

Figure 7 is a side elevation of an improved high pressure hose coupling constructed in accordance with the present invention and in finally assembled position on a hose which is shown partly broken away.

Figure 8 is a similar view with parts broken away showing the coupling body, sleeve and included parts of the hose in longitudinal section with a contracting die and a form of thrust anvil indicated in section.

Figure 9 is a side elevation of a coupling body with a sleeve, shown in longitudinal section, as initially assembled to the coupling body and indicating in section a form of thrust anvil and a contracting die for initially contracting the outside sleeve, and Figure 10 shows a side elevation of a coupling body with an outside sleeve, illustrated in longitudinal section as assembled to, and initially constricted about, the coupling body, to retain the sleeve upon the body as a article of manufacture and sale in readiness to receive the end of a hose prior to the final contraction of the sleeve as shown in Figures 7 and 8.

Referring more particularly to the drawings 10 designates generally a coupling body constructed with an intermediate nut portion 11 having an externally screw threaded male member 12 projecting from one side thereof and a nipple 13 extending axially from the other side of such nut portion 11. The nipple 13 is of greatly reduced external diameter as compared with the external diameter of the nut portion 11, leaving an abutment wall 14 that is substantially vertical or substantially normal to the coupling axis.

Along the exterior of the nipple 13 are provided a series of buttress teeth 15 which taper toward the outer free end of the nipple 13 and provide the usual abrupt shoulders 16 disposed away from the free end of said nipple. In the coupling body is a through opening or bore 17 in the customary manner.

The hose illustrated is that well known form consisting of the inner and outer concentric layers 19 and 20 with an intermediate embedded concentric layer of wire mesh or other reinforcement 21.

A sleeve 33, shown more particularly in Figures 4, 5 and 6, is adapted to be slipped over the coupling body and such sleeve is formed with a nut portion 34 to mate with the nut portion 11 of the coupling body 10. Adjoining the nut portion 34, the sleeve is bulged outwardly slightly, as indicated at 35, to enable the main cylindrical body of the sleeve 33, exclusive of the nut portion 34, to be of an initially large diameter subject to being contracted upon the coupling and hose. The nut portion 34 of the sleeve carries a flange 37 with an opening 38 to fit over the male end 12 of the coupling body.

In Figures 8 and 9 is illustrated an anvil member 45 for aiding in the assembly of the coupling parts and of the assembly of the coupling to the hose.

In Figure 9 is illustrated a split die 40 having an opening 42 to pass over the sleeve 33, said die 40 having preferably a flaring mouth 41 at its leading end for the purpose of engaging and die contracting the sleeve 33 as the die 40 is moved relatively to such sleeve in the direction of the arrows indicated in Figure 9.

The die 40 in Figure 9 is the initial die and its die opening 42 is of such diameter as to only slightly contract the sleeve 33, for instance to the relative diameter shown in Figure 10 where the reduction, indicated at 50, is somewhat less than the corners or ridges of the nut portion 11 of the coupling body. Thus the flange 37 at one side and the crimp or reduction 50 at the other side of the nut portion 11 serve to retain the sleeve assembled to the coupling body as a composite article which may be shipped independently of the hose and sold as an article quite apart from the hose for subsequent assembly with the hose in the hands of the user.

In Figure 8 is shown a second split or other die 51 having a die opening 52 which is of somewhat smaller diameter than the opening 42 of the initial die 40 for the purpose of further contracting the sleeve 33 from the condition shown in Figure 10 to that shown in Figures 7 and 8.

In manufacture, the coupling body shown in Figures 1, 2 and 3 may be separately made and will be recognized to be of a well known form of coupling body. The sleeve, shown in Figures 4, 5 and 6, is separately manufactured. In the condition shown in Figures 4, 5 and 6, which is the initial condition of the sleeve, the same is slid over the coupling body from right to left as viewed in Figure 3 with the flange 37 of the sleeve trailing. This flange 37 acts in the capacity of a stop to strike the adjacent wall face of the nut portion 11 which determines the initially assembled condition of these parts. This condition is shown in Figure 9. The anvil 45 is then inserted over the male threaded extension 12 and against the flange 37; while from the opposite end the die 40 is advanced over the free end of the sleeve 33, and from such free end toward the interfitting nut portions 11 and 34 which accurately and closely fit one another. The die 40 is moved an appropriate distance axially along the sleeve 33 and it results in initially reducing the diameter of the sleeve 33 to a degree less than the diameter of the nut portion 11, or at least of the corner portions of such nut part 11; resulting in forming the reduction or crimp 50 which thereupon interlocks with the face of the nut portion 11 adjacent the nipple 13. This condition of the parts is shown in Figure 10 and forms a separate article of manufacture.

The subsequent act of assembly is shown in Figure 8 wherein the hose 20 has been slid over the nipple until it engages the wall 14 of the coupling body. The internal diameter of sleeve 33, as shown in Figure 10, approximates the external diameter of the hose 20 so that the hose may freely enter the well or chamber bounded by the nipple 13, sleeve 33 and base wall 14 of the coupling body. The anvil 45 is thereupon applied to flange 37 to hold the assembled coupling body and sleeve up to the die 51 which is thereupon slid from the left toward the right (Figure 8) over the initially contracted sleeve 33 to further contract the same and the included portion of the hose 20 down to a constricted diameter which is preferably somewhat less than the normal external diameter of the hose 20.

The complemental interfitting of the two nut portions 11 and 34 will serve to avoid rotation of the sleeve 33 relatively to the coupling body. The flange 37 will arrest the axial motion of the sleeve 33 and indicate when the sleeve has been driven home to final position.

The movement of both die members 40 and 51 is from left to right as viewed in Figures 9 and 8 to cause a progressive constriction or radial contraction in the sleeve 33 initiating at the free open edge thereof and progressing from this free open edge toward the nut portion 34 which is essentially non-contracting owing to its close fit about a rigid non-contractile nut portion 11 of the coupling body. The action of both die members causes the radially inward contraction of the metallic sleeve 33 which will be made of a material admitting of this contraction and of a sufficiently rigid body that on such contraction will withstand the outwardly bulging pressure of the hose.

With the initial die 40 such die may approach very close to the nut portion 34, and in fact the flared mouth 41 may partially overlap the nut portion 34 in the final position of the die 40 in order to secure the contraction of the sleeve 33 up close to the wall 14 of the coupling body. However, it is not so necessary that the final die 51 approach so closely to the nut portion 34 but the constricting opening 52 of the die 51 may with satisfactory results reach a position indicated roughly by the line 53 in Figure 7. Of course the flaring mouth 54 of the final die 51 may be to the right of this line in the final position of the die which will enable the cylindrical wall of the sleeve 33 to assume the final position shown generally in Figure 8 in which the intermediate part of the sleeve 33 flares or inclines outwardly to a progressively enlarging diameter toward the nut portion 34 from the left end portion of the sleeve subjected to maximum contraction. However, those skilled in the art may wish to vary the degree of traverse or lineal movement of the die 51 axially along the sleeve 33 in accordance with differing conditions, differing metals in the sleeve 33 and different types and materials in the hose parts.

The high pressure hose will ordinarily be of a material which is relatively thick with an intermediate filler of numerous interwoven layers of wire strands 21. The inner layer 19 of the hose will become firmly clamped upon the buttress teeth 15, such inner layer being squeezed by the contraction of the sleeve 33 so that it will enter the spaces behind the shoulders of the buttress teeth 16 forming a tight gripping engagement therewith resisting axial displacement of the coupling body from the hose.

It will be appreciated that the improved coupling acts to interlock the parts so as to prevent axial displacement of the parts relative to each other, as well as the hose relative to the coupling. The ability of the coupling parts to hold securely against axial strain results from the construction and relative arrangements of the parts in the combination. The axial strains which the present invention has been designed to cope with are not so much external pulling on the hose or on the coupling as those which result from the internal high pressure force that is transmitted through the hose. Such internal high pressure force, as for instance in grease guns, tends to blow the coupling off the end of the hose and the improved high pressure coupling is designed and built to withstand such shock and simultaneously to be leak-proof.

Another advantage derived from the novel form of construction of the present invention is that the parts can be made of different materials depending upon the conditions to which the couplings are subjected. Such concept is new in relation to high pressure couplings now on the market which are made of one piece. Such one piece couplings are either turned out from solid rod or made by a forging process; in both cases presenting a kind of material that is difficult to deform. In the present instance there is no need to deform the body part, but the outside sleeve, which is to be deformed, can be selected of a material that is fit for that purpose. Sufficient strength can readily be incorporated into the sleeve member. Where the coupling is to be used in airplanes, both body and shell parts may be made of aluminum. In case the coupling is to be subjected to a highly abrasive fluid, the body part that will have to withstand the abrasive action may be made of a suitable steel. In this sense the present invention provides flexibleness in the coupling and enables it to readily lend itself to various uses and conditions.

In contracting the outside sleeve 33 in the manner done by forcing the die from the free end toward the anchored nut portion subjects the hose material confined within the coupling to such a tremendous pressure as to cause the compressed hose material to move along in front of the die 51 and eventually spread out radially in the hollow annular cavity encompassed within the portion of the sleeve 33 adjacent the nut portion 34, this being finally the largest diameter of the sleeve, as shown in Figure 8. The bulged portion of the rubber forms a further extremely strong interlock between the hose and coupling.

The present commercial high pressure couplings require that the outside layer of rubber material of the hose be ground or skived off down to the wire mesh and the coupling collapsed directly upon such wire mesh. The present invention obviates any such removal of rubber material and provides means for interlocking the hose to the coupling with strong anchorage.

Heretofore high pressure couplings have been made of brass or other deformable material. Such material is not very hard. However, by the arrangement of a separately manufactured sleeve 33 we are enabled to produce the necessary hardness and ductility in the outside sleeve 33.

In this sleeve 33, it will be observed from Figures 4, 5 and 6, particularly from Figure 6 that initially there are three distinct differences in wall thickness. The thinnest wall thickness is that in the skirt of the sleeve which has been given the reference numeral 33. A stepped up thickness is shown in the nut portion 34 and the flange 37 is of still progressively greater wall thickness. Pulsating pressure tests have resulted in the flange 34 shearing off at the circumferential line where it connects into the nut section 34. Consequently the sleeve is a drawn cylinder and it is drawn in such manner as to create additional thickness of stock along the circumferential line and in the flange 37 and in the adjacent portions of the nut part 34. This packed material will withstand the strains that accumulate at this point.

The separability of manufacture of the sleeve from the coupling body admits of the use of different materials. The sleeve is made of an alloy of a high copper content to afford a higher degree of malleability and to avoid season cracking which would result in case the sleeve was made of the same material and integral with the body. To assure against any season cracking the outside sleeve may have a copper content between 95% and 99%. The lower limit is probably 85%. In some cases the differential in wall thickness of the sleeve parts may be only in the neighborhood of .008" to .010"; and the wall thickness may be made in any part desired without regard to thickening the walls of the other portions.

In some instances, for example in the ¾" coupling, the cylindrical wall of the sleeve may be .065" whereas the base wall 37 is .110". The thinness of the cylindrical wall is desirable for purposes of the two die contracting operations but it is not desirable to sacrifice strength of wall on this account. Therefore we propose to give the cylindrical part of the shell or sleeve 33 a final drawing operation after all other forming and annealing operations. Such final drawing operation is designed to give a sufficient pinch to the metal in that part of the shell that amounts to a physical change in the molecular structure of the metal. This pinching of the metals hardens the same and increases the tensile strength and therefore the thin cylindrical wall of the shell can be made as strong as the thicker end wall 37 of the same.

Without the spider the sleeve 33 of the present application comes in continuous and uninterrupted contact as to all of its internal surface with the external surface of the hose which it holds under compression. This forms a complete continuity of tenacious effect between the rubber of the hose and the internal wall of the metal sleeve 33 which prevents any axial relative slippage of these two parts.

In some or possibly all cases the squeezed material of the rubber, elastic or deformable hose will swell radially outward at the first zone where it is unconfined by the shell cylinder or skirt 33 and we have attempted to indicate at 55 in Figs. 7 and 8 the observed bulge in the hose.

The initial die contracting operation has two functions; first, it may be a slight contraction but sufficient to cause the sleeve to be forced in back of the adjacent face of the nut section particularly in the regions of the nut corners to thus lock the sleeve to the coupling body and incidentally this reduction brings the diameter of the sleeve down approximately to the diameter of the hose to which the coupling is to be assembled; and secondly one of the advantages of the double die contracting operation is that it makes it much easier to reduce the coupling at the final assembly than if it had to go from its original diameter down to the diameter where it is die contracted on the hose for permanent assembly.

It is obvious that various changes and modifications may be made in the details of construction and design of the above specifically described embodiment of this invention without departing from the spirit thereof, such changes and modifications being restricted only by the scope of the following claims.

What is claimed is:

1. A high pressure hose coupling comprising a substantially rigid coupling body having a nipple to enter the hose and a polygonal enlarged portion, and a separate malleable sleeve having a polygonal portion closely fitting over the corresponding polygonal portion of the coupling body and a generally cylindrical skirt portion enveloping the hose and nipple and die contracted substantially throughout its cylindrical area into squeezing relation upon the base.

2. A high pressure hose coupling comprising a substantially rigid coupling body having a nipple to enter the hose and an enlarged polygonal portion, and a separate malleable sleeve having an open end and a substantially cylindrical skirt of sufficient initial diameter to axially slide over the enlarged portion to cause the skirt to envelop the nipple and included part of the hose, said sleeve having a polygonal portion to slide on and mate with the enlarged portion of the coupling body, said sleeve also having means on the end portion opposite to the open end to engage with the enlarged portion to arrest the axial movement of the sleeve in its final home position, said sleeve being die contracted substantially throughout its entire cylindrical area to compress the hose radially inward at all circumferential points upon the rigid nipple.

3. A high pressure hose coupling comprising a substantially rigid coupling body having a nipple to enter the hose and an enlarged portion, a separate malleable sleeve fitted over said enlarged portion and having a flanged end abutted against the outer face of said enlarged portion as a stop, portions of said sleeve being reduced to engage against the opposite or inner face of said enlarged portion whereby said body and sleeve will be interlocked together as a unit before assembly to a hose.

4. A high pressure coupling comprising a coupling body having a hose-receiving nipple and an enlarged portion, a separately made malleable shell slid over the enlarged portion and having a base to engage one side of the enlarged portion as a stop, the shell at the opposite side of the enlarged portion being cylindrically reduced substantially from its open end up to the coupling enlarged portion and of a diameter less than said enlarged portion to engage the adjacent face of the same and interlock the shell and coupling together as a rigid unit.

5. A high pressure hose coupling comprising a substantially rigid coupling body having a nipple to enter the hose and an enlarged polygonal portion against which the end of the hose is abutted as a stop, a separate malleable sleeve fitted over said enlarged polygonal portion and having a tubular portion fitted about the hose, another portion complementary to said enlarged polygonal portion of the coupling body snugly fitting the latter to preclude relative rotation of said sleeve to said body, and a flanged portion adapted to abut against the outer face of said enlarged polygonal portion as a stop.

6. A coupling comprising a body having a nipple to enter the hose and an enlarged polygonal portion, and a drawn sleeve of malleable material having a complemental part fitted over said enlarged polygonal portion and having a base flange engaging the outer face of said enlarged portion as a stop, a substantial portion of said sleeve being initially reduced beyond and adjacent said polygonal portion to an inside diameter less than the distance across the points of said polygonal portion as a means to hold said sleeve and body together as a unit prior to the coupling assembly upon the hose, and said sleeve being further reduced after the coupling is assembled to the hose end to compress the hose material between the nipple and said sleeve for effecting a permanent assembly.

7. A coupling comprising a body having a nipple to enter the hose and an enlarged portion, and a drawn sleeve of malleable material slipped over said enlarged body portion and having a base flange engaging the outer face of said enlarged portion as a stop, said sleeve being initially reduced substantially from its open end up to and less than the major dimension across said enlarged portion as a means to hold said sleeve and body together as a unit prior to the coupling assembly upon the hose, and said sleeve being further reduced after the coupling is assembled to the hose end to compress the hose material between the nipple and said sleeve for effecting a permanent assembly.

ALBERT C. ×his mark LUSHER.
EMERSON H. TOMPKINS.
GEORGE G. HOWARD.

Witness to Lusher's mark:
CATHERINE A. DEELEY.